(12) United States Patent
Lee et al.

(10) Patent No.: US 12,526,135 B2
(45) Date of Patent: Jan. 13, 2026

(54) METHOD FOR ENCRYPTING MESSAGE AND SYSTEM THEREOF

(71) Applicant: SAMSUNG SDS CO., LTD., Seoul (KR)

(72) Inventors: Hee Wook Lee, Seoul (KR); Seung Jin Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 87 days.

(21) Appl. No.: 18/746,584

(22) Filed: Jun. 18, 2024

(65) Prior Publication Data

US 2025/0106017 A1    Mar. 27, 2025

(30) Foreign Application Priority Data

Sep. 26, 2023  (KR) .................... 10-2023-0129234

(51) Int. Cl.
*H04L 29/06* (2006.01)
*H04L 9/08* (2006.01)

(52) U.S. Cl.
CPC ................... *H04L 9/0869* (2013.01)

(58) Field of Classification Search
CPC ... H04L 9/0869; H04L 9/3247; H04L 9/3297; H04L 9/14; H04L 9/0825; H04L 9/30; H04L 9/3236; H04L 51/043
See application file for complete search history.

(56) References Cited

U.S. PATENT DOCUMENTS

| 6,986,046 B1 * | 1/2006 | Tuvell ............... H04L 12/1822 713/168 |
| 2015/0365424 A1 | 12/2015 | Pelletier |

FOREIGN PATENT DOCUMENTS

| CN | 110474780 A | * 11/2019 | ........... H04L 9/3297 |
| CN | 113347215 A | * 9/2021 | ......... H04L 63/0869 |
| JP | 2011-82832 A | 4/2011 | |
| KR | 10-1269025 B1 | 5/2013 | |
| KR | 10-2017-0006813 A | 1/2017 | |
| KR | 10-2021-0097471 A | 8/2021 | |

OTHER PUBLICATIONS

F. Wei, P. Vijayakumar, Q. Jiang and R. Zhang, "A Mobile Intelligent Terminal Based Anonymous Authenticated Key Exchange Protocol for Roaming Service in Global Mobility Networks," in IEEE Transactions on Sustainable Computing, vol. 5, No. 2, pp. 268-278, Apr. 1-Jun. 2020. (Year: 2020).*

* cited by examiner

*Primary Examiner* — Shawnchoy Rahman
(74) *Attorney, Agent, or Firm* — NSIP Law

(57) ABSTRACT

There is provided a method for encrypting a message, performed by a computing device. The method may comprise receiving a public signature key and a public mid term key, which are generated in a terminal, from the terminal and storing them; forwarding the stored public signature key and the stored public mid term key to all terminals participating in a chat room; designating a key generator based on a timestamp-based first random number value included in all the terminals; and generating a message encryption key by using a private mid term key of the designated key generator, wherein the message encryption key is shared is all the terminals.

20 Claims, 8 Drawing Sheets

METHOD FOR ENCRYPTING MESSAGE AND SYSTEM THEREOF

CROSS-REFERENCE TO RELATED APPLICATION

This application claims priority from Korean Patent Application No. 10-2023-0129234 filed on Sep. 26, 2023 in the Korean Intellectual Property Office and all the benefits accruing therefrom under 35 U.S.C. 119, the contents of which in its entirety are herein incorporated by reference.

BACKGROUND

Technical Field

The present disclosure relates to a method for encrypting a message and a system thereof, and more particularly, to a method for encrypting a message, in which the message is encrypted using a message encryption key, and a system for performing the method.

Description of the Related Art

Full forward secrecy refers to a feature that describes means for preventing session keys from being damaged even though a private key of a server is damaged. To this end, protocols related to full forward and maintenance generate unique session keys for all sessions initiated by a user. Even though the session key is damaged, data exchanged outside a corresponding particular session is still protected.

As a method for applying forward secrecy in message security, a method for encrypting one message N times in case of a chat room with N people and transmitting the encrypted message to each of the N people is mainly used.

However, when forward secrecy is applied to a message security method as above, there may be inefficiency in forwarding N encryption statements to a network when sending a message and in performing encryption N times.

Therefore, in order to solve the above problem and increase efficiency of the message security method, it is required to provide a method for encrypting a message, which can reduce the number of times for message encryption while applying forward secrecy at a certain level.

PRIOR ART REFERENCE

Patent Reference

US Laid-Open Patent No. 2015-0365424

BRIEF SUMMARY

An object of the present disclosure is to provide a method for encrypting a message and a system for performing the same, in which the number of times for message encryption is reduced.

Another object of the present disclosure is to provide a method for encrypting a message and a system for performing the same, in which a message encryption key is shared.

Other object of the present disclosure is to provide a method for encrypting a message and a system for performing the same, in which forward secrecy is used and network usage efficiency is increased.

The objects of the present disclosure are not limited to those mentioned above and additional objects of the present disclosure, which are not mentioned herein, will be clearly understood by those skilled in the art from the following description of the present disclosure.

According to an aspect of the present closure, there is provided a method for encrypting a message, performed by a computing device. The method may comprise receiving a public signature key and a public mid term key, which are generated in a terminal, from the terminal and storing them; forwarding the stored public signature key and the stored public mid term key to all terminals participating in a chat room; designating a key generator based on a timestamp-based first random number value included in all the terminals; and generating a message encryption key by using a private mid term key of the designated key generator, wherein the message encryption key is shared is all the terminals.

In some embodiments, the public signature key is generated in a key pair with a private signature key, and the private signature key is stored in the terminal.

In some embodiments, the private signature key is to generate a signature for a message hash value, and the public signature key is to authenticate the signature for the message hash value.

In some embodiments, the public mid term key is generated in a key pair with a private mid term key, and the private mid term key is stored in the terminal.

In some embodiments, a random number value is encrypted based on the public mid term key and the private mid term key.

In some embodiments, a new temporary public key and a new temporary private key are generated at regular period intervals from the public mid term key and the private mid term key, respectively.

In some embodiments, the designating a key generator based on a timestamp-based first random number value included in all the terminals may include selecting terminals in an online state among all the terminals currently participating in the chat room; generating a first random number value based on a current timestamp for the selected terminals in the online state; and designating the key generator based on the number of the terminals in the online state and the generated first random number value.

In some embodiments, the method may further comprise generating a shared secret key by a key exchange between the private mid term key of the key generator and the public mid term key of the participant of the chat room; and encrypting a second random number value by the shared secret key, wherein the second random number value is generated by the designated key generator.

In some embodiments, the generating a message encryption key by using the private mid term key of the designated key generator may include encrypting a second random number value generated by the key generator; allowing all terminals to share the encrypted second random number value; and generating a message encryption key by the respective terminals based on the shared second random number value.

In some embodiments, the method may further comprise inducing a terminal of a new participant, who is not connected to the chat room, by a participant who is connected to the chat room; generating a shared secret key based on a temporary private key of a terminal of a participant connected to the chat room and a temporary public key of the terminal of the new participant who is not connected to the chat room; and providing the new participant with a message generated before the new participant is connected to the chat room, based on the shared secret key.

In some embodiments, the inducing a terminal of a new participant, who is not connected to the chat room, by a participant who is connected to the chat room includes: generating a new temporary public key and a new temporary private key in the terminal of the participant connected to the chat room; and inducing the terminal of the new participant who is not connected to the chat room and sharing the new temporary public key.

In some embodiments, the generating a shared secret key based on a temporary private key of a terminal of a participant connected to the chat room and a temporary public key of the terminal of the new participant who is not connected to the chat room includes: generating a temporary public key and a temporary private key in the terminal of the new participant; generating the shared secret key by a key exchange between the temporary private key of the terminal of the participant connected to the chat room and the temporary public key of the terminal of the new participant; and sharing the generated shared secret key in the terminal of the participant connected to the chat room and the terminal of the new participant induced from the participant.

In some embodiments, the providing the new participant with a message generated before the new participant is connected to the chat room, based on the shared secret key includes: inducing a message encryption key through the shared secret key and encrypting a message to be shared; decrypting the encrypted message through the message encryption key; generating a new temporary public key and a new temporary private key in each of the terminal of the participant connected to the chat room and the terminal of the new participant induced from the participant; and sharing the generated new temporary public key with all terminals of the participants in the chat room.

In some embodiments, the method may further comprise switching the participant in the chat room from an offline state to an online state; and sharing messages exchanged in the chat room before the participant of the chat room is switched from the offline state to the online state.

In some embodiments, the sharing messages exchanged in the chat room for a first period corresponding to a period before the participant in the chat room is switched from an offline state to an online state may include selecting a message forwarder based on the number of the messages exchanged in the chat room for the first period; and receiving the messages exchanged in the chat room for the first period from the selected message forwarder to share them.

According to still another aspect of the present closure, there is provided a system for encrypting a message. The system may comprise one or more processors; and a memory for storing instructions, wherein the one or more processors, by executing the stored instructions, perform: an operation of receiving a public signature key and a public mid term key, which are generated in a terminal, from the terminal and storing them; an operation of forwarding the stored public signature key and the stored public mid term key to all terminals participating in a chat room; an operation of designating a key generator based on a timestamp-based first random number value included in all the terminals; and an operation of generating a message encryption key by using a private mid term key of the designated key generator, wherein the message encryption key is shared in all the terminals.

In some embodiments, the operation of designating a key generator based on a timestamp-based first random number value included in all the terminals may include an operation of selecting terminals in an online state among all the terminals currently participating in the chat room; an operation of generating a first random number value based on a current timestamp for the selected terminals in the online state; and an operation of designating the key generator based on the number of terminals in the online state and the generated first random number value.

In some embodiments, the operation of generating a message encryption key by using the private mid term key of the designated key generator may include an operation of encrypting a second random number value generated by the key generator; an operation of allowing all terminals to share the encrypted second random number value; and an operation of generating a message encryption key by the respective terminals based on the shared second random number value.

In some embodiments, the one or more processors may further perform: an operation of inducing a terminal of a new participant, who is not connected to the chat room, by a participant who is connected to the chat room; an operation of generating a shared secret key based on a temporary private key of a terminal of a participant connected to the chat room and a temporary public key of the terminal of the new participant who is not connected to the chat room; and an operation of providing the new participant with a message generated before the new participant is connected to the chat room, based on the shared secret key.

In some embodiments, the one or more processors may further perform: an operation of switching the participant in the chat room from an offline state to an online state; and an operation of sharing messages exchanged in the chat room before the participant of the chat room is switched from the offline state to the online state.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE DISCLOSURE

Hereinafter, various embodiments of the present disclosure will be described with reference to the accompanying drawings.

Figure 1:
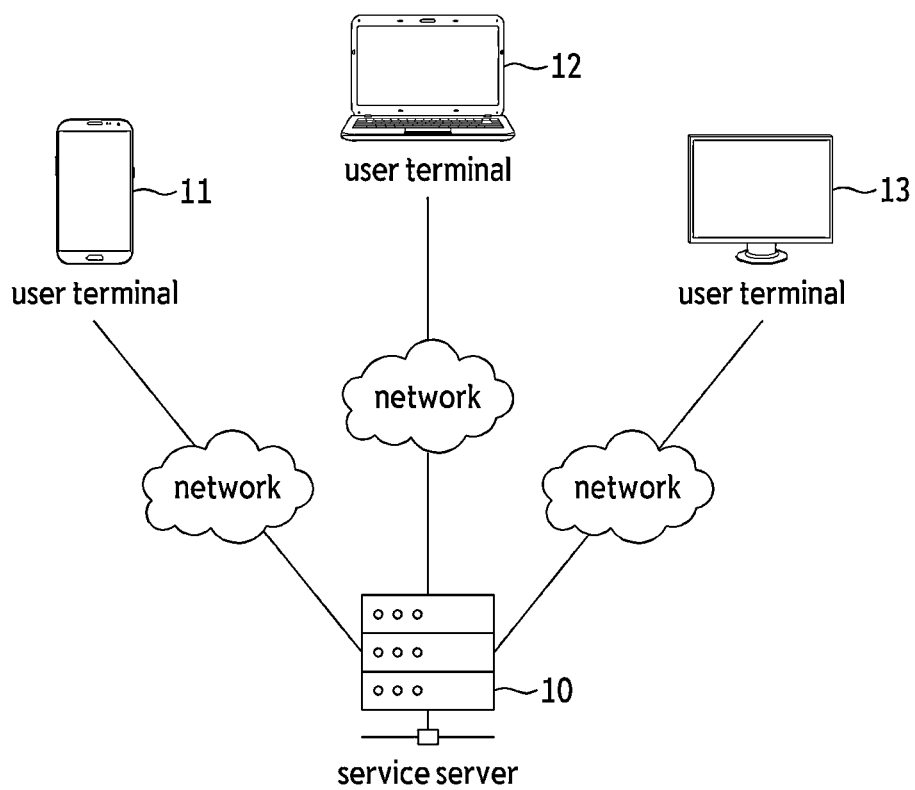
FIG. 1 is a schematic view illustrating a system for encrypting a message based on a service server according to one embodiment of the present disclosure.

FIG. 1 is a schematic view illustrating a system for encrypting a message based on a service server according to one embodiment of the present disclosure.

As shown in FIG. 1, a system for protecting a user data encryption key in a simple authentication environment may include a service server 10 and user terminals 11 to 13.

In this case, the service server 10 may receive and store message encryption keys generated from each of the user terminals 11 to 13. In addition, the service server 10 may allow the user terminals 11 to 13 to share the stored message encryption keys. Details related to this will be described in more detail with reference to the drawings below.

Next, each of the user terminals 11 to 13 may include a mobile phone, a desktop, and a laptop. In addition, the user terminals 11 to 13 may be separated for each device not a subject of the terminal.

For example, the user terminals 11 to 13 may be separated for each device such as the mobile phone 11, the laptop 12 and the desktop 13 by the same user.

Also, even though the user terminals 11 to 13 according to some embodiments of the present disclosure are participating in a chat room, since they cannot receive a message in an offline state, they may share messages exchanged between other user terminals in an offline state when entering an online state. A detailed description related to this will be given with reference to FIG. 10 below.

Figure 2:
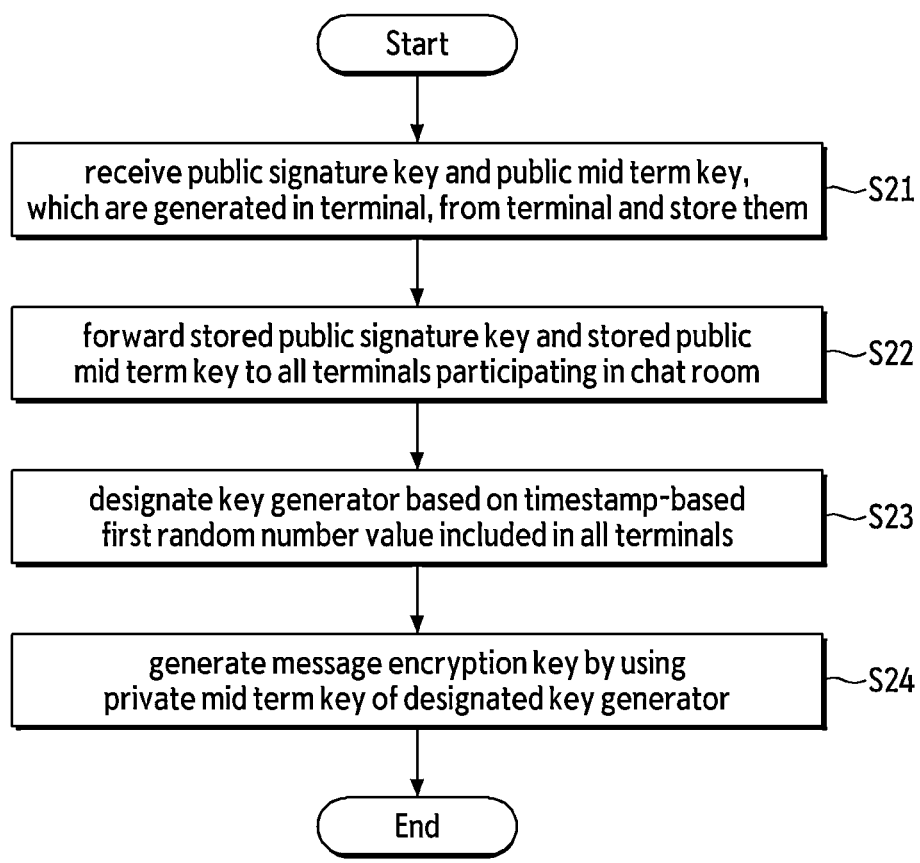
FIG. 2 is a flow chart illustrating a process of generating a message encryption key in a user terminal.

FIG. 2 is a flow chart illustrating a process of generating a message encryption key in a user terminal.

In step S21, a service server may receive and store a public signature key and a public mid term key generated in a user terminal from the user terminal. In this case, the public signature key and the public mid term key may be generated from respective terminals.

In detail, the public signature key may be generated from the user terminal in a pair with a private signature key, and the public mid term key may be generated from the user terminal in a pair with a private mid term key.

In addition, the private signature key according to the present disclosure may generate a signature for a message hash value, and the public signature key may authenticate the signature for the message hash value. In other words, the private signature key may be used before a message is encrypted and the encrypted message is transmitted, and the public signature key may be used when the encrypted message is received and the user terminal is authenticated.

This is because that the private signature key and the private mid term key, which are generated from the user terminal, are stored in their user terminals, and the public signature key and the public mid term key, which are generated from the user terminals, may be stored in the service server and shared in all terminals.

Therefore, when the encrypted message is received, authentication may be performed using a public signature key of a message sender, which is stored in the server, and a decryption process of the encrypted message may be performed. A detailed description related to this will be given with reference to the drawings below.

In step S22, the service server may forward the public signature key and the public mid term key, which are stored therein, to all terminals participating in the chat room. As described above, the service server may forward the public signature key and the public mid term key so that all terminals participating in the chat room may share them with each other.

In this case, the shared public mid term key may be used to generate the message encryption key. A detailed description related to this will be given in detail with reference to the drawings below.

In step S23, the service server may designate a key generator based on a timestamp-based first random number value included in all terminals. In this case, the first random number value may be a value used to designate the key generator, and may be a number having no specific order or rule. In addition, the key generator may be continuously changed with a certain period, and in this case, the first random number value may be also changed. A process of designating a key generator based on a first random number value included in all terminals by a service server will be described in detail with reference to FIG. 3.

In step S24, a flow chart illustrating a process of generating a message encryption key by a user terminal by using a private mid term key of a designated key generator is shown. In detail, when the user terminal generates a message encryption key, a private mid term key of the key generator and a public mid term key for a participant user terminal may be required. A detailed description related to this will be given with reference to FIG. 4.

Figure 3:
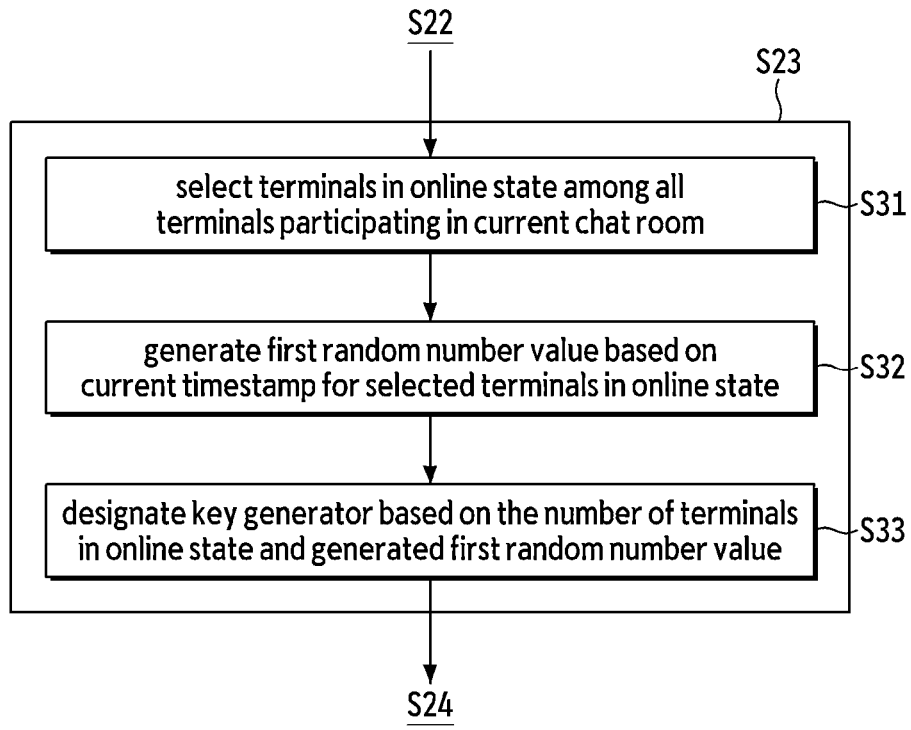
FIG. 3 is a detailed flow chart illustrating a process of designating a key generator based on a timestamp-based first random number value included in terminals.

FIG. 3 is a detailed flow chart illustrating a process of designating a key generator based on a timestamp-based first random number value included in terminals.

In step S31, the service server may select terminals in an online state from all terminals currently participating in the chat room. Since the message may be shared through continuous communication of the key generator with terminals of participants connected to an online state, the key generator may be selected from the terminals in the online state.

In step S32, a current timestamp-based first random number value may be generated for the selected terminals in the online state. The timestamp may be the time when each terminal is online or the time corresponding to hours of each terminal being online up to now, or may simply mean the current time.

A time unit of the timestamp may be seconds or minutes, but may not be limited thereto. However, for convenience of description, the description will be continued on the assumption that the timestamp represents the current time and its unit is seconds.

In addition, the timestamp generation is not limited to the above example, and the first random number value may be generated differently from the above example. However, according to the present disclosure, when the key generator is selected using the first random number value which is randomly generated, it is possible to prevent one participant from exclusively generating the message encryption key.

In step S33, the service server may designate the key generator based on the number of terminals in the online state and the generated first random number value. In this case, the number of terminals in the online state may include each of a plurality of devices in case of participants who use the plurality of devices.

In addition, different numbers may be given to the devices of the participants, and the remainder may be derived by dividing the first random number value by the total devices. Also, the user of the device having a number corresponding to the remainder may be the key generator.

For example, when the timestamp has a value of 120 s and the number of devices is 7, 1 may be derived as the remainder. In this case, the user of device 1 may be the key generator. The key generator may be selected in the above way, but it is only an example. The key generator may be selected in other ways as far as the timestamp value and the number of devices are considered.

The message encryption key may be generated in step S24 by using the private mid term key of the key generator designated in step S23. A detailed description related to this will be given below.

Figure 4:
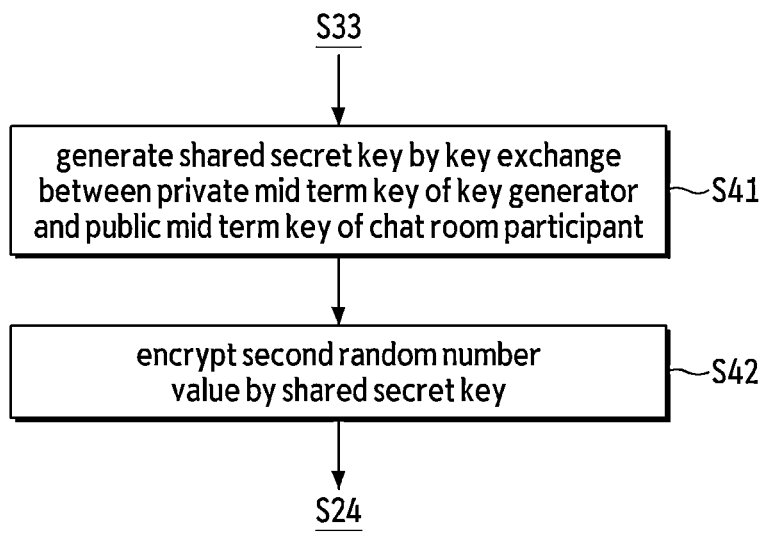
FIG. 4 is a flow chart illustrating a process of generating a message encryption key by using a private mid term key of a key generator.

FIG. 4 is a flow chart illustrating a process of generating a message encryption key by using a private mid term key of a key generator.

In step S41, a shared secret key may be generated by a key exchange between a private mid term key of the key generator and a public mid term key of a participant of a chat room. In detail, since the public mid term key of the participant of the chat room is stored in the service server, the key generator may generate the shared secret key by the key exchange between its private mid term key and the public mid term key of the participants of the chat room, which is stored in the service server.

In addition, a method of generating the shared secret key may be performed by an Elliptic Curve Diffie-Hellman (ECDH) algorithm. The ECDH is a key exchange algorithm or a key agreement algorithm such as a Diffie-Hellman (DH) algorithm. Since those skilled in the art to which the corresponding security technology pertains are familiar with the ECDH, a detailed description of the ECDH will be omitted.

Next, the shared secret key may be also generated between the participants of the chat room. That is, the shared secret key may be generated by the key exchange between the public mid term key and the private mid term key even among the participants of the chat room excluding the key generator. The shared secret key generated between the respective participants and the shared secret key generated between the key generator and the participants of the chat room may be all shared. However, the shared secret key may not be shared with participants who do not participate in the process of generating the shared secret key.

In step S42, a second random number value may be encrypted by the shared secret key. In this case, the second random number value may be a number randomly set to induce the message encryption key. In addition, all participants in the chat room may share the second random number value, the second random number value may be encrypted by the shared secret key generated in step S41, and the encrypted second random number value may be shared with the respective participants.

Figure 5:
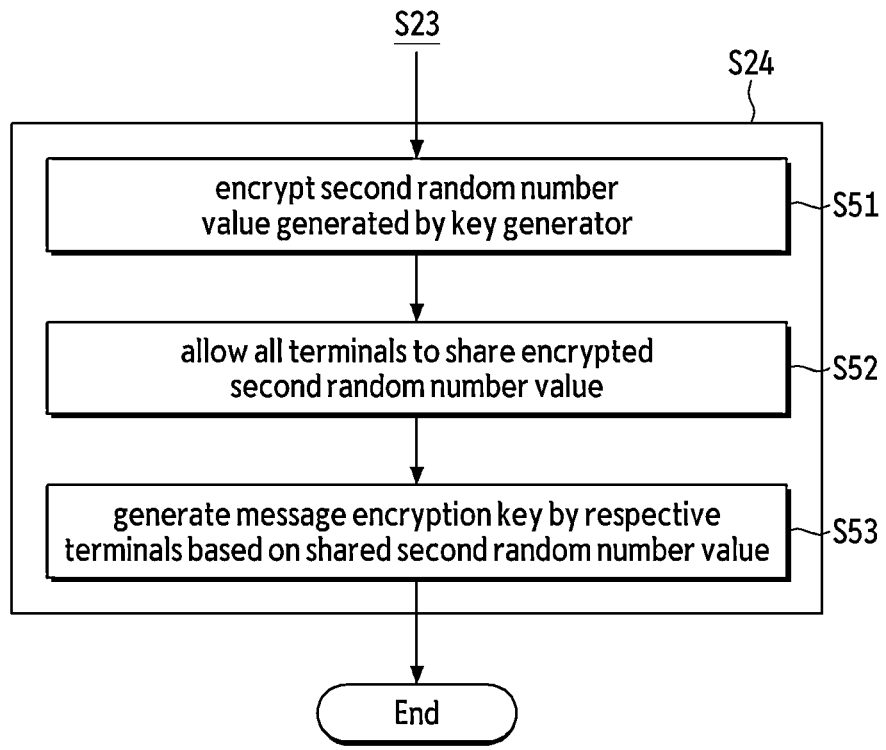
FIG. 5 is a detailed flow chart illustrating a process of generating a message encryption key by using a private mid term key of a key generator.

FIG. 5 is a detailed flow chart illustrating a process of generating a message encryption key by using a private mid term key of a key generator.

In step S51, the second random number value generated by the key generator may be encrypted. As described above, the second random number value may be encrypted with the shared secret key shared with each participant. In step S52, all terminals may share the encrypted second random number value. This may mean that each participant may share the encrypted second random number value.

Finally, in step S53, a message encryption key may be generated in each of the terminals based on the shared second random number value. In this case, the message encryption keys generated in the terminals may be the same.

In detail, the respective terminals may induce the message encryption key in accordance with the ECDH algorithm by using the shared second random number value and the previous message encryption key, and the message encryption keys induced to the respective terminals may be the same.

Therefore, when a specific terminal encrypts a message by using the message encryption key, another terminal may decrypt the message by using the same message encryption key. In this case, network usage efficiency may be increased in that the same message encryption key is used.

Figure 6:
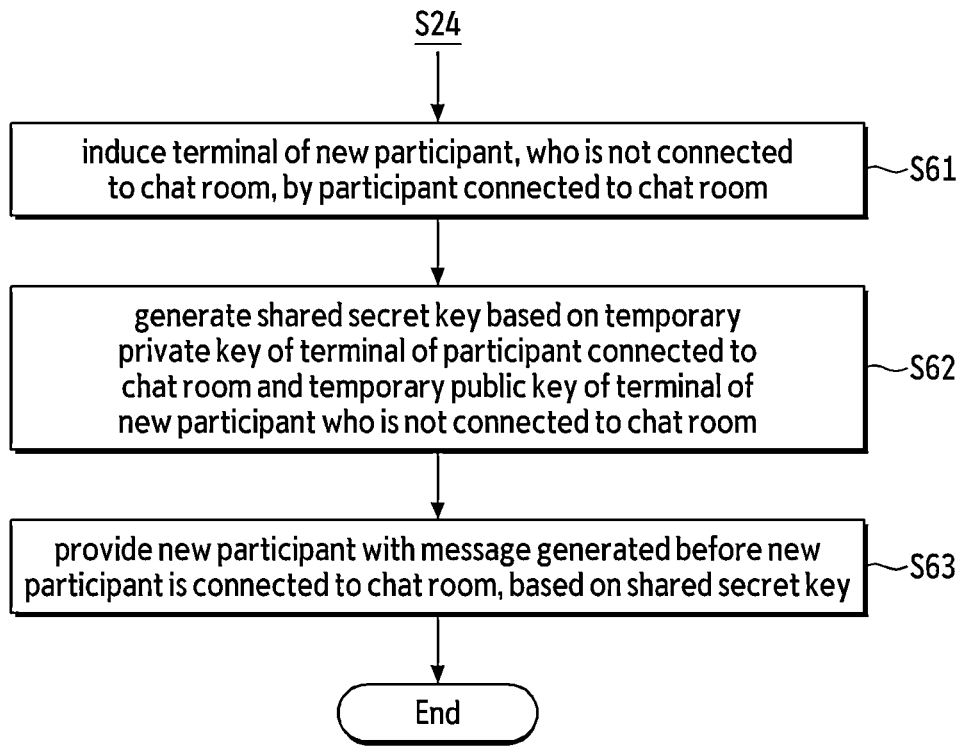
FIG. 6 is a flow chart illustrating a process of providing a previously generated message to a new participant when the new participant is connected to a chat room.

FIG. 6 is a flow chart illustrating a process of providing a previously generated message to a new participant when the new participant is connected to a chat room.

In step S61, a terminal of a new participant who is not connected to the chat room may be induced by a participant who is connected to the chat room. In detail, an inviter, who is the participant who has been already connected to the chat room and induces the terminal of the new participant, may generate a temporary public key that is a new public mid term key, and a temporary private key that is a new private mid term key. After the temporary public key is generated, the inviter may invite the new participant to the chat room.

Next, the new participant may generate a temporary public key and a temporary private key after being invited to the chat room, and the inviter and the new participant may share the temporary public key with each other.

In step S62, the shared secret key may be generated based on the temporary public key of the new participant participating in the chat room and the temporary private key of the inviter. In this case, the process of generating the shared secret key is the same as the process of generating the shared secret key between the terminals of the participants described in FIG. 4.

In step S63, a message generated before the new participant is connected to the chat room may be provided to the new participant based on the shared secret key.

First, the inviter may induce the message encryption key through the shared secret key shared with the new participant, and may encrypt a previous message to be shared by using the induced message encryption key.

Next, the inviter may share the encrypted message with the new participant. When the new participant receives the encrypted message, terminals of the inviter and the new participant invited to the chat room may generate a new temporary public key and a new temporary private key, respectively, and may share the generated temporary public key with all participants in the chat room.

Also, in this case, in addition to the inviter, the existing participants in the chat room may generate a new temporary public key and a temporary private key, respectively, and may share the temporary public key with the new participant. That is, when inviting the new participant, all participants may generate a new temporary public key and a temporary private key and perform key exchange.

Figure 7:
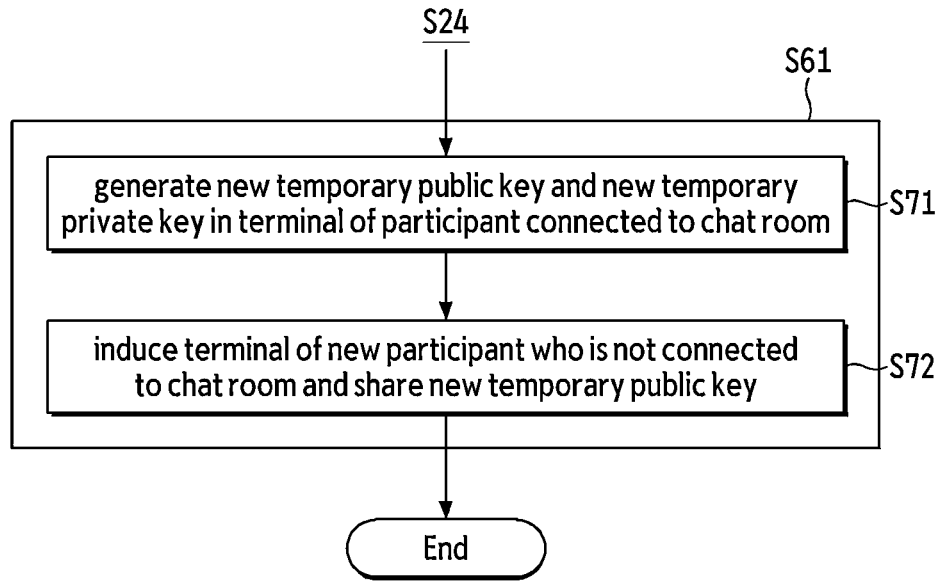
FIG. 7 is a detailed flow chart illustrating a process of inducing a terminal of a new participant who is not connected to a chat room by a participant who is connected to the chat room.

FIG. 7 is a detailed flow chart illustrating a process of inducing a terminal of a new participant who is not connected to a chat room by a participant who is connected to the chat room.

First, in step S71, a new temporary public key and a new temporary private key may be generated in the terminal of the inviter who is a participant connected to the chat room. In step S72, a terminal of a new participant, who is not connected to the chat room, may be induced. Also, the new temporary public key generated in the terminal of the inviter may be shared with the new participant.

In addition, when the new participant participates in the chat room, a new temporary public key and a new temporary private key may be generated in the terminal of the participant, and the newly generated temporary public key may be shared with the inviter.

The description related to this has been given in the description of step S61, and thus will be omitted.

Figure 8:
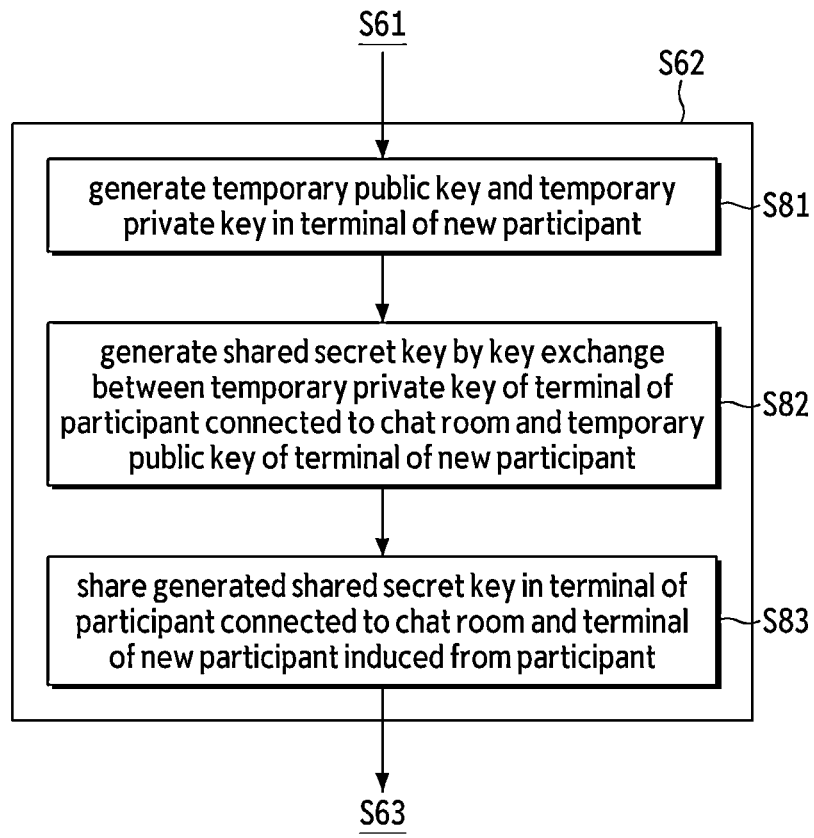
FIG. 8 is a detailed flow chart illustrating a process of generating a shared secret key based on a temporary private key of a terminal of a participant connected to a chat room and a temporary public key of a terminal of a new participant who is not connected to the chat room.

FIG. 8 is a detailed flow chart illustrating a process of generating a shared secret key based on a temporary private key of a terminal of a participant connected to a chat room and a temporary public key of a terminal of a new participant who is not connected to the chat room.

First, after a temporary public key and a temporary private key are generated in the terminal of the new participant in step S81, a shared secret key may be generated through key exchange between the temporary private key of the terminal of the inviter and the temporary public key of the terminal of the new participant in step S82. In this case, the key exchange method may be performed by the ECDH method as described above.

Next, in step S83, the generated shared secret key may be shared in the terminal of the participant who is connected to the chat room and the terminal of the new participant induced from the participant. The process of generating the shared secret key and the process of sharing the generated shared secret key have been described with reference to S41 of FIG. 4 and thus a detailed description thereof will be omitted.

Figure 9:
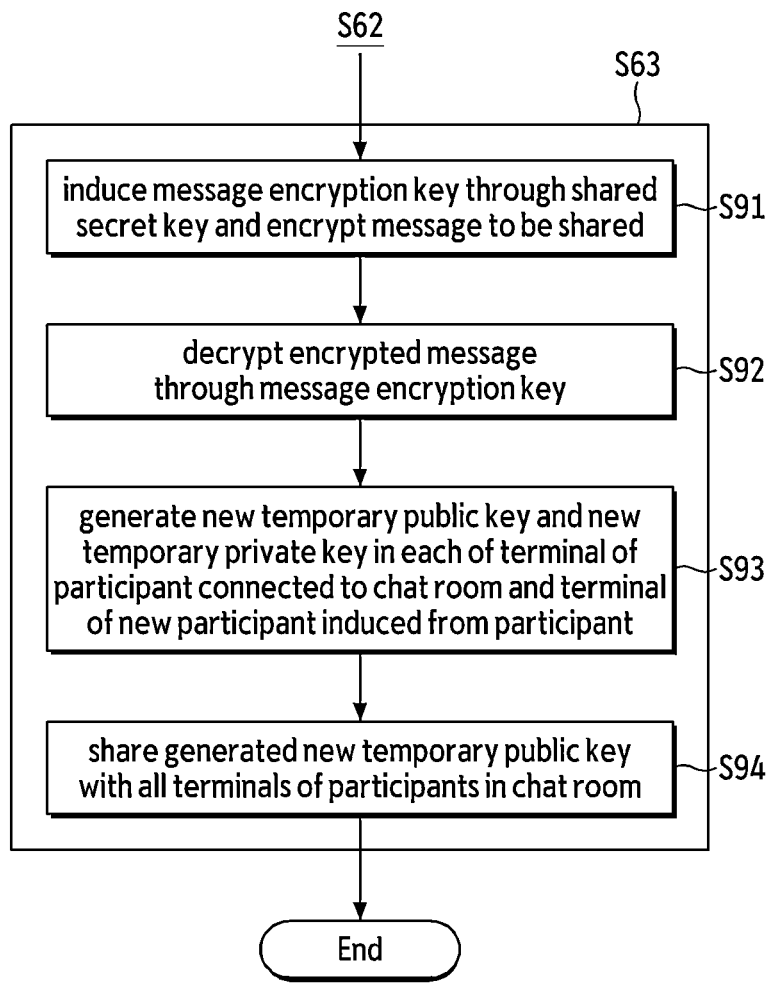
FIG. 9 is a detailed flow chart illustrating a process of sharing a generated shared secret key in a terminal of a participant who is connected to a chat room and a terminal of a new participant induced from the participant.

FIG. 9 is a detailed flow chart illustrating a process of sharing a generated shared secret key in a terminal of a participant who is connected to a chat room and a terminal of a new participant induced from the participant.

In step S91, the inviter may induce a message encryption key through the shared secret key and encrypt a message to be shared by using the message encryption key. In addition, the message encrypted by the terminal of the inviter through the message encryption key may be transmitted to the new participant. In addition, the message encryption key may be shared with the participant.

In step S92, the new participant participating in the chat room may decrypt the encrypted message through the message encryption key. In this case, the message encryption key may be a message encryption key shared by the inviter in step S91.

In step S93, a new temporary public key and a new temporary private key may be generated in each of the terminals of the participants who is connected to the chat room and the new participant induced from the participant. The generated temporary public key may be shared with all terminals of the participants in the chat room in step S94.

Figure 10:
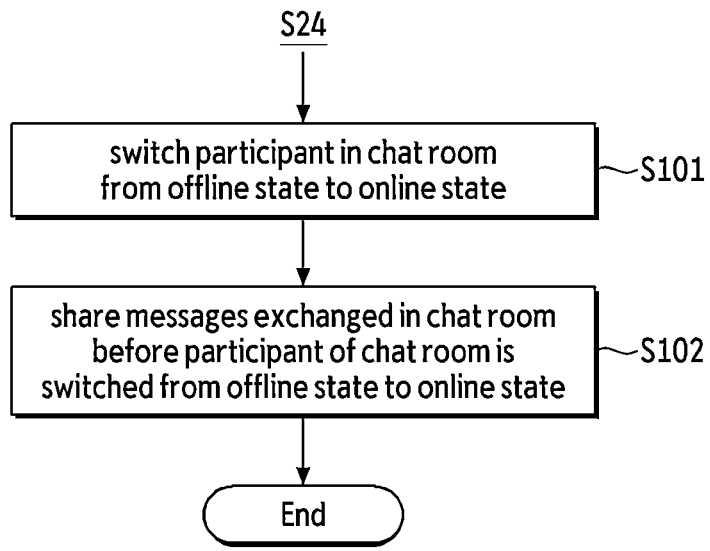
FIG. 10 is a flow chart illustrating a process of sharing messages exchanged in a chat room before switching when a participant in the chat room is switched from an offline state to an online state.

FIG. 10 is a flow chart illustrating a process of sharing messages exchanged in a chat room before switching when a participant in the chat room is switched from an offline state to an online state.

In step S101, the participant of the chat room may be switched from an offline state to an online state. In the offline state, when a key exchange event occurs after a certain period, since a situation in which a random number value may not be shared may occur, it may be desirable that the participant of the chat room may separately receive messages exchanged when the participant is switched from the offline state to the online state.

Next, in step S102, the messages exchanged in the chat room before the participant of the chat room is switched from the offline state to the online state may be shared. In order for the participant switched to the online state to share the previous message, a process of selecting a message forwarder may be required. A detailed description related to this will be given with reference to FIG. 11 below.

Figure 11:
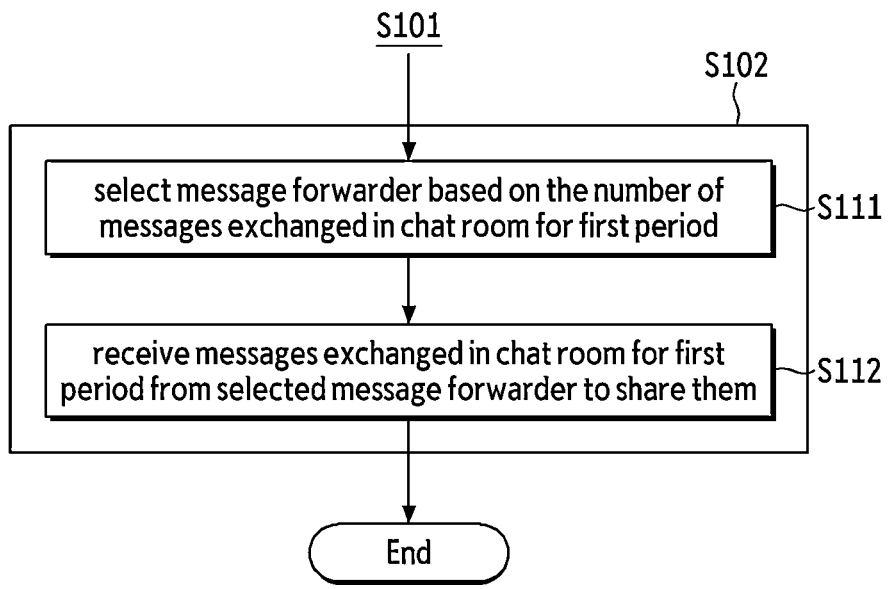
FIG. 11 is a detailed flow chart illustrating a process of sharing a message generated in an offline state when a participant in a chat room is switched to an online state.

FIG. 11 is a detailed flow chart illustrating a process of sharing a message generated in an offline state when a participant in a chat room is switched to an online state.

First, in step S111, a message forwarder may be selected based on the number of messages exchanged in the chat room for a first period. In this case, the first period may mean the time when the participant of the chat room exists in the offline state before entering the online state. Therefore, a terminal including the largest number of messages for the first period, which is the time when the participant of the chat room exists in the offline state, may be selected as the message forwarder.

However, a method of selecting a message forwarder is not limited to the number of messages, and any terminal including a message generated when the participant is in the offline state may become the message forwarder. However, for convenience of description, the description will be continued on the assumption that a method of selecting a message forwarder in the present disclosure is selected based on the number of messages.

In detail, the service server may designate a key generator based on the number of messages own by each of the terminals in the online state for the first period and the first random number value.

In addition, different numbers may be given to the devices of the participants, and the remainder may be derived by dividing the first random number value by the total devices. The user of the device having the number corresponding to the remainder may be the key generator. This is the same as the concept of the steps S32 and S33 and thus its description will be omitted.

Next, in step S112, the terminal of the participant may receive the messages exchanged in the chat room for the first period from the selected message forwarder to share them. The method of sharing messages has been described in step S63 of FIG. 6, and its detailed description will be omitted.

The method for encrypting a message according to some embodiments of the present disclosure has been described with reference to FIGS. 1 to 11. Hereinafter, a hardware configuration of a system for encrypting a message will be described with reference to FIG. 12.

Figure 12:
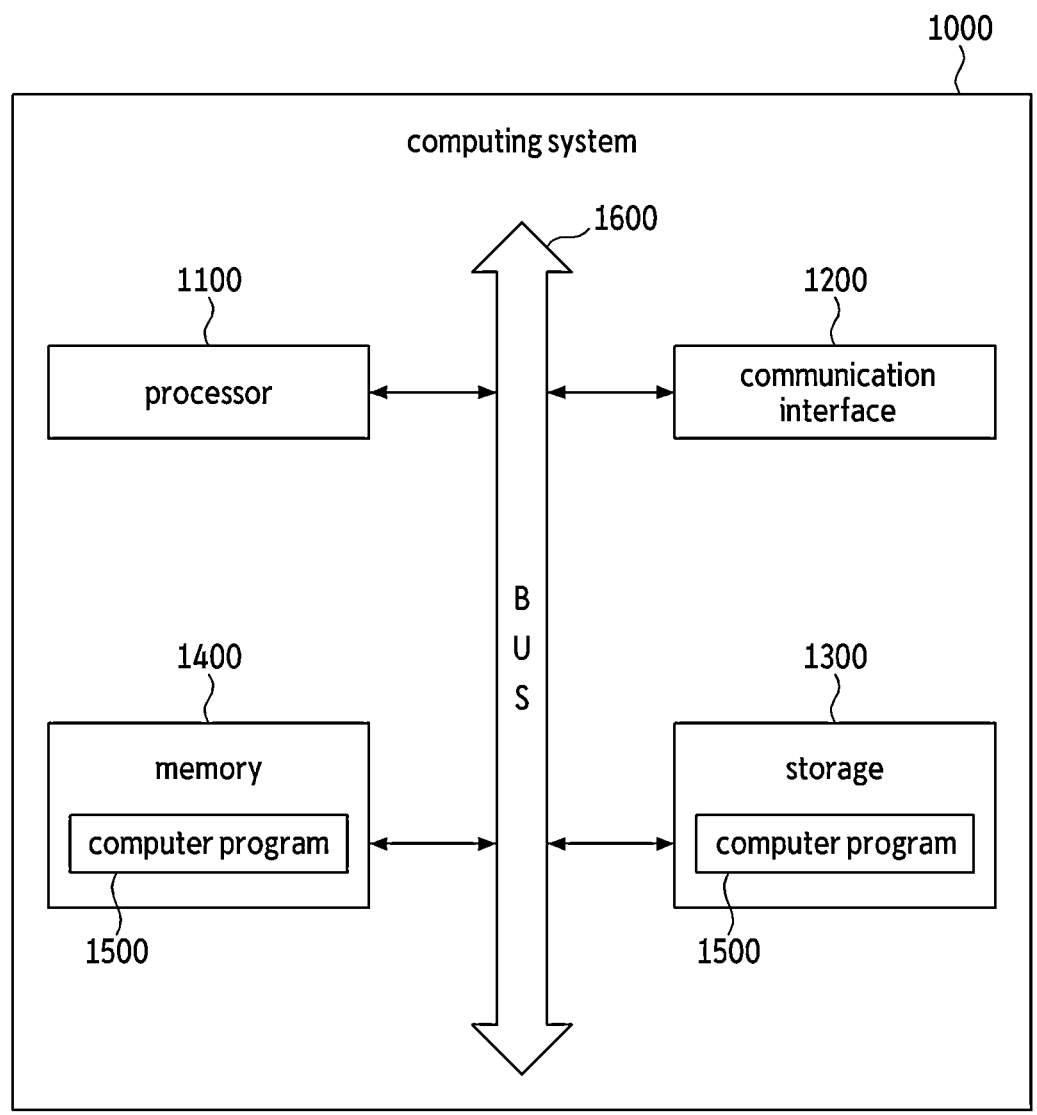
FIG. 12 is an exemplary hardware schematic view illustrating a computing system according to some embodiments of the present disclosure.

FIG. 12 is an exemplary hardware schematic view illustrating a computing system 1000 according to some embodiments of the present disclosure. The computing system 1000 corresponds to the messaging encryption service server 10 described above.

As shown in FIG. 12, the computing system 1000 may include one or more processors 1100, a bus 1600, a communication interface 1200, a memory 1400 for loading a computer program 1500 performed by the processor 1100, and a storage 1300 for storing the computer program 1500.

However, only components related to the embodiment of the present disclosure are shown in FIG. 12. Therefore, those skilled in the art to which the present disclosure pertains may note that other general-purpose components may be further included in the computing system 1000 in addition to the components shown in FIG. 12. That is, the computing system 1000 may further include various components in addition to the components shown in FIG. 12. Also, in some cases, the computing system 1000 may be configured in a form in which some of the components shown in FIG. 12 are omitted. Hereinafter, each component of the computing system 1000 will be described.

The processor 1100 controls the overall operation of each component of the computing system 1000. The processor 1100 may include at least one of a Central Processing Unit (CPU), a Micro Processor Unit (MPU), a Micro Controller Unit (MCU), a Graphic Processing Unit (GPU), a Neural Processing Unit (NPU) or any type of processor well known in the technical field of the present disclosure. In addition, the processor 1100 may perform computation for at least one application or program for executing the method/operation according to the embodiments of the present disclosure. The computing system 1000 may include one or more processors.

Next, the memory 1400 may store various data, commands and/or information. The memory 1400 may load the computer program 1500 from the storage 1300 to execute the method/operation according to the embodiments of the present disclosure. The memory 1400 may be implemented as a volatile memory such as RAM, but the technical scope of the present disclosure is not limited thereto.

Next, the bus 1600 provides a communication function between the components of the computing system 1000. The bus 1600 may be implemented as various types of buses such as an address bus, a data bus and a control bus.

Next, the communication interface 1200 may support wired/wireless Internet communication of the computing system 1000. Also, the communication interface 1200 may support various communication methods other than Internet communication. To this end, the communication interface 1200 may include a communication module well known in the technical field of the present disclosure.

Next, the storage 1300 may non-temporarily store one or more computer programs 1500. The storage 1300 may include a non-volatile memory such as a Read Only Memory (ROM), an Erasable Programmable ROM (EPROM), an Electrically Erasable Programmable ROM (EEPROM) and a flash memory, a hard disk, a detachable disk or any type of computer-readable recording medium well known in the art to which the present disclosure pertains.

Next, the computer program 1500 may include one or more instructions that, when loaded into the memory 1400, cause the processor 1100 to perform the method/operation according to various embodiments of the present disclosure. That is, the processor 1100 may perform the method/operation according to various embodiments of the present disclosure by executing the one or more instructions.

For example, the computer program 1500 may include an instruction of receiving a public signature key and a public mid term key, which are generated in a terminal, from the terminal and storing them, an instruction of forwarding the stored public signature key and the stored public mid term key to all terminals participating in a chat room, an instruction of designating a key generator based on a timestamp-based first random number value included in all the terminals, and an instruction of generating a message encryption key by using a private mid term key of the designated key generator, wherein the message encryption key is shared in all the terminals.

The hardware configuration of the computing system 1000 according to some embodiments of the present disclosure has been described with reference to FIG. 12.

What is claimed is:

1. A method for encrypting a message, performed by a computing device, the method comprising:
   receiving a public signature key and a public mid term key, which are generated in a terminal, from the terminal and storing them;
   forwarding the stored public signature key and the stored public mid term key to all terminals participating in a chat room;
   designating a key generator based on a timestamp-based first random number value included in all the terminals; and
   generating a message encryption key by using a private mid term key of the designated key generator,
   wherein the message encryption key is shared is all the terminals.

2. The method of claim 1, wherein the public signature key is generated in a key pair with a private signature key, and the private signature key is stored in the terminal.

3. The method of claim 2, wherein the private signature key is to generate a signature for a message hash value, and
   the public signature key is to authenticate the signature for the message hash value.

4. The method of claim 1, wherein the public mid term key is generated in a key pair with a private mid term key, and
   the private mid term key is stored in the terminal.

5. The method of claim 4, wherein a random number value is encrypted based on the public mid term key and the private mid term key.

6. The method of claim 5, wherein a new temporary public key and a new temporary private key are generated at regular period intervals from the public mid term key and the private mid term key, respectively.

7. The method of claim 1, wherein the designating a key generator based on a timestamp-based first random number value included in all the terminals includes:
   selecting terminals in an online state among all the terminals currently participating in the chat room;
   generating a first random number value based on a current timestamp for the selected terminals in the online state; and
   designating the key generator based on the number of the terminals in the online state and the generated first random number value.

8. The method of claim 7, further comprising:
   generating a shared secret key by a key exchange between the private mid term key of the key generator and the public mid term key of the participant of the chat room; and
   encrypting a second random number value by the shared secret key,
   wherein the second random number value is generated by the designated key generator.

9. The method of claim 1, wherein the generating a message encryption key by using the private mid term key of the designated key generator includes:
   encrypting a second random number value generated by the key generator;
   allowing all terminals to share the encrypted second random number value; and
   generating a message encryption key by the respective terminals based on the shared second random number value.

10. The method of claim 1, further comprising:
inducing a terminal of a new participant, who is not connected to the chat room, by a participant who is connected to the chat room;
generating a shared secret key based on a temporary private key of a terminal of a participant connected to the chat room and a temporary public key of the terminal of the new participant who is not connected to the chat room; and
providing the new participant with a message generated before the new participant is connected to the chat room, based on the shared secret key.

11. The method of claim 10, wherein the inducing a terminal of a new participant, who is not connected to the chat room, by a participant who is connected to the chat room includes:
generating a new temporary public key and a new temporary private key in the terminal of the participant connected to the chat room; and
inducing the terminal of the new participant who is not connected to the chat room and sharing the new temporary public key.

12. The method of claim 10, wherein the generating a shared secret key based on a temporary private key of a terminal of a participant connected to the chat room and a temporary public key of the terminal of the new participant who is not connected to the chat room includes:
generating a temporary public key and a temporary private key in the terminal of the new participant;
generating the shared secret key by a key exchange between the temporary private key of the terminal of the participant connected to the chat room and the temporary public key of the terminal of the new participant; and
sharing the generated shared secret key in the terminal of the participant connected to the chat room and the terminal of the new participant induced from the participant.

13. The method of claim 10, wherein the providing the new participant with a message generated before the new participant is connected to the chat room, based on the shared secret key includes:
inducing a message encryption key through the shared secret key and encrypting a message to be shared;
decrypting the encrypted message through the message encryption key;
generating a new temporary public key and a new temporary private key in each of the terminal of the participant connected to the chat room and the terminal of the new participant induced from the participant; and
sharing the generated new temporary public key with all terminals of the participants in the chat room.

14. The method of claim 1, further comprising:
switching the participant in the chat room from an offline state to an online state; and
sharing messages exchanged in the chat room before the participant of the chat room is switched from the offline state to the online state.

15. The method of claim 14, wherein the sharing messages exchanged in the chat room for a first period corresponding to a period before the participant in the chat room is switched from an offline state to an online state includes:
selecting a message forwarder based on the number of the messages exchanged in the chat room for the first period; and
receiving the messages exchanged in the chat room for the first period from the selected message forwarder to share them.

16. A system for encrypting a message, the system comprising:
one or more processors; and
a memory for storing instructions,
wherein the one or more processors, by executing the stored instructions, perform:
an operation of receiving a public signature key and a public mid term key, which are generated in a terminal, from the terminal and storing them;
an operation of forwarding the stored public signature key and the stored public mid term key to all terminals participating in a chat room;
an operation of designating a key generator based on a timestamp-based first random number value included in all the terminals; and
an operation of generating a message encryption key by using a private mid term key of the designated key generator,
wherein the message encryption key is shared in all the terminals.

17. The system of claim 16, wherein the operation of designating a key generator based on a timestamp-based first random number value included in all the terminals includes:
an operation of selecting terminals in an online state among all the terminals currently participating in the chat room;
an operation of generating a first random number value based on a current timestamp for the selected terminals in the online state; and
an operation of designating the key generator based on the number of terminals in the online state and the generated first random number value.

18. The system of claim 16, wherein the operation of generating a message encryption key by using the private mid term key of the designated key generator includes:
an operation of encrypting a second random number value generated by the key generator;
an operation of allowing all terminals to share the encrypted second random number value; and
an operation of generating a message encryption key by the respective terminals based on the shared second random number value.

19. The system of claim 16, wherein the one or more processors further perform:
an operation of inducing a terminal of a new participant, who is not connected to the chat room, by a participant who is connected to the chat room;
an operation of generating a shared secret key based on a temporary private key of a terminal of a participant connected to the chat room and a temporary public key of the terminal of the new participant who is not connected to the chat room; and
an operation of providing the new participant with a message generated before the new participant is connected to the chat room, based on the shared secret key.

20. The system of claim 16, wherein the one or more processors further perform:
an operation of switching the participant in the chat room from an offline state to an online state; and
an operation of sharing messages exchanged in the chat room before the participant of the chat room is switched from the offline state to the online state.

* * * * *